US012632685B2

(12) United States Patent　(10) Patent No.:　US 12,632,685 B2

Goto et al.　(45) Date of Patent:　May 19, 2026

(54) PRINTING APPARATUS, READING METHOD, AND READING APPARATUS

(71) Applicant: SEIKO EPSON CORPORATION, Tokyo (JP)

(72) Inventors: Atsushi Goto, Matsumoto (JP); Takashi Kobayashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 288 days.

(21) Appl. No.: 18/614,791

(22) Filed: Mar. 25, 2024

(65) Prior Publication Data

US 2024/0326408 A1　Oct. 3, 2024

(30) Foreign Application Priority Data

Mar. 27, 2023　(JP) ................................. 2023-049469

(51) Int. Cl.
G06K 15/02　(2006.01)
B41J 2/045　(2006.01)

(52) U.S. Cl.
CPC ........ G06K 15/027 (2013.01); B41J 2/04505 (2013.01); B41J 2/04508 (2013.01)

(58) Field of Classification Search
None
See application file for complete search history.

(56) References Cited

U.S. PATENT DOCUMENTS

| | | | | |
|---|---|---|---|---|
| 7,633,646 B2 * | 12/2009 | Ichitani | ................ | H04N 1/6033 |
| | | | | 358/1.9 |
| 8,801,136 B2 * | 8/2014 | Chen | ...................... | H04N 1/407 |
| | | | | 347/15 |

| | | | | |
|---|---|---|---|---|
| 2005/0094170 A1 * | 5/2005 | Ichitani | ................ | H04N 1/6033 |
| | | | | 358/1.9 |
| 2010/0201726 A1 * | 8/2010 | Kondo | ................... | B41J 2/0459 |
| | | | | 29/890.1 |
| 2014/0002522 A1 * | 1/2014 | Chen | ...................... | H04N 1/407 |
| | | | | 347/13 |
| 2019/0126609 A1 * | 5/2019 | Mizutani | .............. | H04N 1/6041 |
| 2022/0410561 A1 * | 12/2022 | Yamamoto | ........... | B41J 2/04505 |
| 2023/0098337 A1 * | 3/2023 | Nakano | ................ | B41J 2/04505 |
| | | | | 347/20 |

FOREIGN PATENT DOCUMENTS

JP　　2019-081344 A　　5/2019

* cited by examiner

*Primary Examiner* — Andrew H Lam

(74) *Attorney, Agent, or Firm* — Spencer Fane LLP

(57)　　　　　　ABSTRACT

A printing apparatus includes a printing head, a control unit, a reading unit, and a storage unit, forms a test pattern for correcting a printing characteristic onto a medium, and corrects the printing characteristic based on a reading result of the test pattern by the reading unit. The reading unit reads a density of a printing surface on the medium in units of reading resolution in a first reading direction and a second reading direction intersecting the first reading direction. The storage unit stores an inclination angle $\theta$ ($0°<\theta<90°$) along the printing surface of a reading direction that serves as a reference of inclination from a scanning direction intersecting an alignment direction of a plurality of nozzles of the first reading direction and the second reading direction and the scanning direction. The control unit causes the reading unit to read the test pattern in a state where the reading direction is inclined by the inclination angle $\theta$ from the scanning direction.

7 Claims, 11 Drawing Sheets

PRINTING APPARATUS, READING METHOD, AND READING APPARATUS

The present application is based on, and claims priority from JP Application Serial Number 2023-049469, filed Mar. 27, 2023, the disclosure of which is hereby incorporated by reference herein in its entirety.

BACKGROUND

1. Technical Field

The present disclosure relates to a printing apparatus including a reading unit that reads a density of a printing surface, a reading method, and a reading apparatus.

2. Related Art

As a printing apparatus, an inkjet printing apparatus including a printing head having a nozzle row configured to eject a droplet to a medium, and a reading unit that reads a printing image in units of a reading resolution is known. In the printing apparatus of this type, a test pattern for correcting the density of a printing image is printed on a medium, and the density of the printing image is corrected based on a reading result of the test pattern by the reading unit.

The inkjet recording apparatus disclosed in JP-A-2019-81344 calculates a density unevenness correction value from density information obtained by reading the density of a test chart, and performs correction on image data based on the density unevenness correction value.

A periodic density variation called moire may occur in a reading result of a test pattern by the reading unit. Here, the "periodic density change" means occurrence of an error in the reading result of the test pattern, and it is different from "density unevenness" of the printing image due to the non-uniformity of the amount of ink ejected from the nozzle. When the moire occurs, an error occurs in the reading result of the test pattern, and as a result, an error originating from the moire occurs in the "density unevenness correction value". For this reason, it is desirable to reduce the influence of moire when reading the test pattern.

SUMMARY

A printing apparatus of the present disclosure includes a printing head having a nozzle row in which a plurality of nozzles configured to eject a droplet onto a medium are aligned, a control unit that controls movement of at least one of the medium and the printing head in a scanning direction intersecting an alignment direction of the plurality of nozzles, and ejection of the droplet from the printing head, a reading unit that reads a density of a printing surface in the medium in units of reading resolution in a first reading direction and a second reading direction intersecting the first reading direction, and a storage unit that stores test pattern data used in formation of a test pattern for correcting a printing characteristic, in which the printing apparatus forms the test pattern on the medium and corrects the printing characteristic based on a reading result of the test pattern by the reading unit, and has an aspect in which the storage unit stores an inclination angle θ that satisfies 0°<θ<90° along the printing surface of a reading direction that serves as a reference of inclination from the scanning direction of the first reading direction and the second reading direction, and the scanning direction, and the control unit causes the reading unit to read the test pattern in a state where the reading direction is inclined by the inclination angle θ from the scanning direction.

A reading method of the present disclosure is a reading method for moving, along a scanning direction intersecting an alignment direction of a plurality of nozzles configured to eject a droplet to a medium, at least one of the medium and a printing head having a nozzle row in which the plurality of nozzles are aligned, ejecting the droplet from the printing head, forming a test pattern for correcting a printing characteristic on the medium, and correcting the printing characteristic based on a reading result of the test pattern by a reading unit that reads a density of a printing surface in the medium in units of reading resolution in a first reading direction and a second reading direction intersecting the first reading direction, the reading method has an aspect of including a storing step for a storage unit to store an inclination angle θ that satisfies 0°<θ<90° along the printing surface of a reading direction that serves as a reference of inclination from the scanning direction of the first reading direction and the second reading direction, and the scanning direction, and a reading step for the reading unit to read the test pattern in a state where the reading direction is inclined by the inclination angle θ from the scanning direction.

Furthermore, a reading apparatus of the present disclosure is a reading apparatus that reads a test pattern for correcting a printing characteristic formed by a printing apparatus including a printing head having a nozzle row in which a plurality of nozzles configured to eject a droplet onto a medium are aligned, and a control unit that controls movement of at least one of the medium and the printing head in a scanning direction intersecting an alignment direction of the plurality of nozzles, and ejection of the droplet from the printing head, the printing apparatus that forms the test pattern, the reading apparatus has an aspect of including a reading unit that reads a density of a printing surface in the medium in units of reading resolution in a first reading direction and a second reading direction intersecting the first reading direction, a conveyance unit that conveys the medium having the test pattern to the reading unit, and an inclination processing unit that inclines the medium such that a reading direction that serves as a reference of inclination from the scanning direction of the first reading direction and the second reading direction inclines by an inclination angle θ that satisfies 0°<θ<90° along the printing surface from the scanning direction when the medium is conveyed to the reading unit.

Furthermore, a reading apparatus of the present disclosure is a reading apparatus that reads a test pattern for correcting a printing characteristic formed by a printing apparatus including a printing head having a nozzle row in which a plurality of nozzles configured to eject a droplet onto a medium are aligned, and a control unit that controls movement of at least one of the medium and the printing head in a scanning direction intersecting an alignment direction of the plurality of nozzles, and ejection of the droplet from the printing head, the printing apparatus that forms the test pattern, the reading apparatus has an aspect of including a medium placement unit on which the medium is placed, a plurality of reading elements that read a density of a printing surface in the medium while moving in at least one of the first reading direction and the second reading direction, and a guide that determines an orientation of the medium placed on the medium placement unit such that a reading direction that serves as a reference of inclination from the scanning direction of the first reading direction and the second reading direction inclines by an inclination angle θ that satisfies 0°<θ<90° along the printing surface from the scanning direction when the test pattern on the medium placed on the medium placement unit is read by the plurality of reading elements.

DESCRIPTION OF EMBODIMENTS

Figure 1:
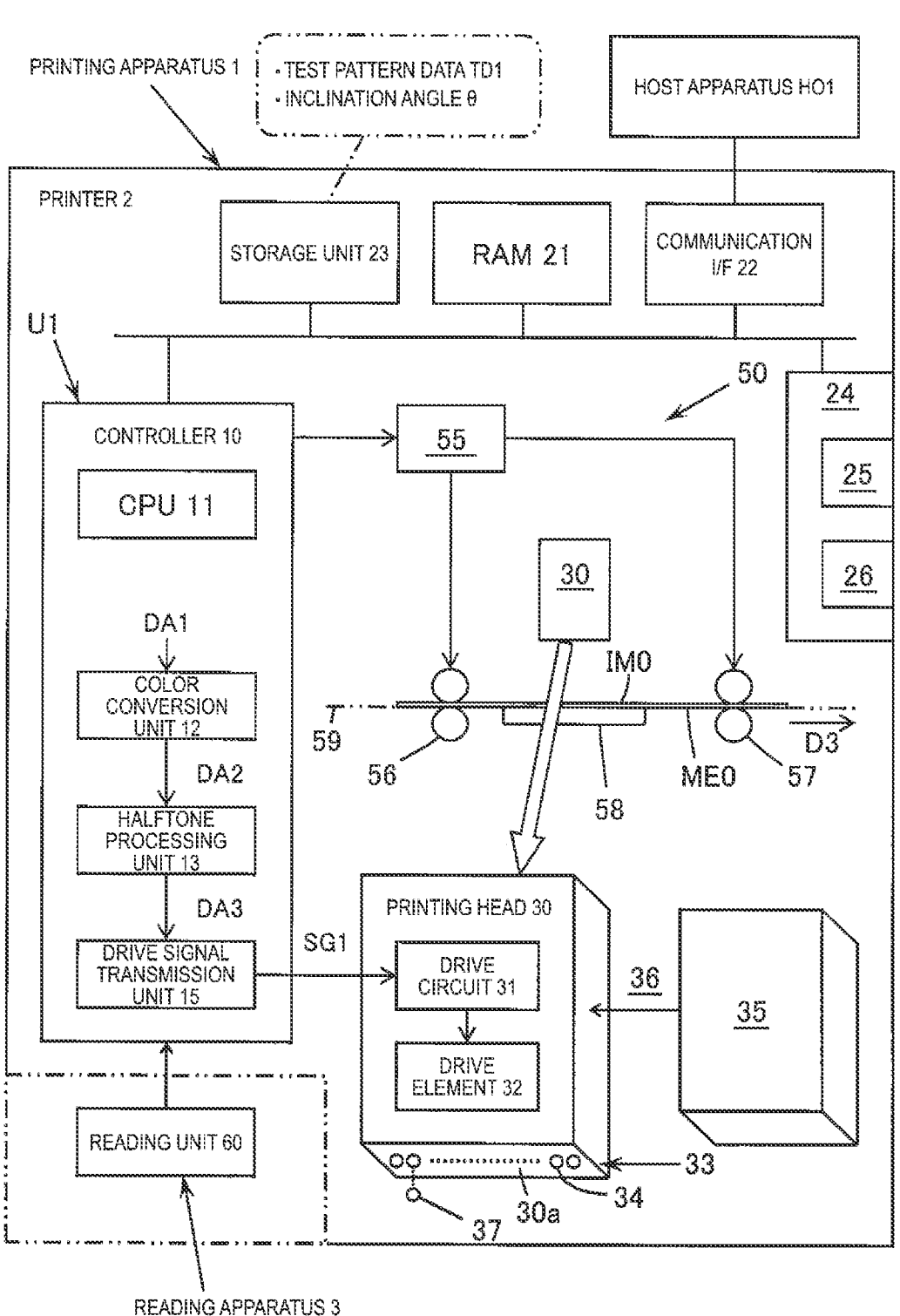
FIG. 1 is a view schematically illustrating an example of a printing apparatus including a reading apparatus.

Hereinafter, an embodiment of the present disclosure will be described. Of course, the following embodiment is merely illustrative of the present disclosure, and not all of the characteristics presented in the embodiment are essential to the solution of the disclosure.

(1) Overview of Technology Included in Present Disclosure

First, an overview of the technology included in the present disclosure will be described with reference to the examples illustrated in FIGS. 1 to 11. Note that the figures in the present application are views schematically illustrating examples, magnifications in each direction indicated in these figures may be different, and the figures may be inconsistent with one another. Of course, each element of the present technology is not limited to a specific example indicated by a reference sign. In "Overview of Technology Included in Present Disclosure", a parenthesized word indicates a supplementary description of an immediately preceding word.

Aspect 1

A printing apparatus 1 according to one aspect of the present technology includes a printing head 30, a control unit U1, a reading unit 60, and a storage unit 23 (see, for example, FIG. 1), forms a test pattern TP0 for correcting a printing characteristic on a medium ME0, and corrects the printing characteristic based on a reading result of the test pattern TP0 by the reading unit 60. The printing head 30 includes a nozzle row 33 in which a plurality of nozzles 34 configured to eject a droplet 37 to the medium ME0 are arranged. The control unit U1 controls movement of at least one of the medium ME0 and the printing head 30 in a scanning direction (e.g., a feeding direction D3) intersecting an alignment direction D4 of the plurality of nozzles 34, and ejection of the droplet 37 from the printing head 30. The reading unit 60 reads the density of a printing surface ME0p on the medium ME0 in units of reading resolution in a first reading direction (e.g., an element alignment direction D5) and a second reading direction (e.g., a movement direction D6) intersecting the first reading direction (D5). The storage unit 23 stores test pattern data TD1 used in formation of the test pattern TP0. The storage unit 23 stores an inclination angle θ (0°<θ<90°) along the printing surface ME0p of a reading direction D10 that serves as a reference of inclination from the scanning direction (D3) of the first reading direction (D5) and the second reading direction (D6) and the scanning direction (D3). As illustrated in FIGS. 2, 5, and 7 to 11, the control unit U1 causes the reading unit 60 to read the test pattern TP0 in a state where the reading direction D10 is inclined by the inclination angle θ from the scanning direction (D3).

When the orientation according to the reading resolution of the reading unit 60 is designed to match the orientation according to the printing resolution, if an error occurs when the reading unit 60 reads the test pattern TP0, moire may occur in the image to be read. The control unit U1 causes the reading unit 60 to read the test pattern TP0 by intentionally inclining the reading direction D10 by the inclination angle θ (0°<θ<90°) along the printing surface ME0p from the scanning direction (D3). This makes the above-described moire less likely to occur in the test pattern TP0 to be read. Therefore, the above aspect can provide a printing apparatus configured to reduce the influence of moire when reading a test pattern.

Here, the scanning direction includes a direction along a relative movement direction of the medium in a line printing apparatus and a main scanning direction in a serial printing apparatus.

The control unit may perform control of moving the medium along the scanning direction without moving the printing head, control of moving the printing head along the scanning direction without moving the medium, and control of moving both the medium and the printing head along the scanning direction.

The inclination angle θ may be an angle with reference to a direction (e.g., a width direction D1 illustrated in FIG. 2) orthogonal to the scanning direction. This case is also included in the inclination angle θ along the printing surface between the reading direction and the scanning direction.

The "first", "second", or the like in the present application are terms for identifying each constituent element included in a plurality of constituent elements having similarity, and do not mean an order.

The storage unit of the printing apparatus that has arrived at a user may store default test pattern data or may store downloaded test pattern data. The storage unit may store the default inclination angle θ or may store the downloaded inclination angle θ.

In general, moire means an interference fringe that occurs when a plurality of periodic structures are superimposed. In the above-described aspect, one of the periodic structures means an arrangement of a plurality of dots included in the test pattern. Another periodic structure means the reading resolution at the reading unit such as the arrangement of a plurality of reading elements serving as the reading resolution.

The printing characteristics include the density of a printing image, the conveyance amount of a medium, and the forward and backward ejection timing in a serial printing apparatus. Therefore, the test pattern includes various test patterns to be influenced by the moire.

Note that the above-described additional remarks are also applied to the following aspects.

Aspect 2

Figure 2:
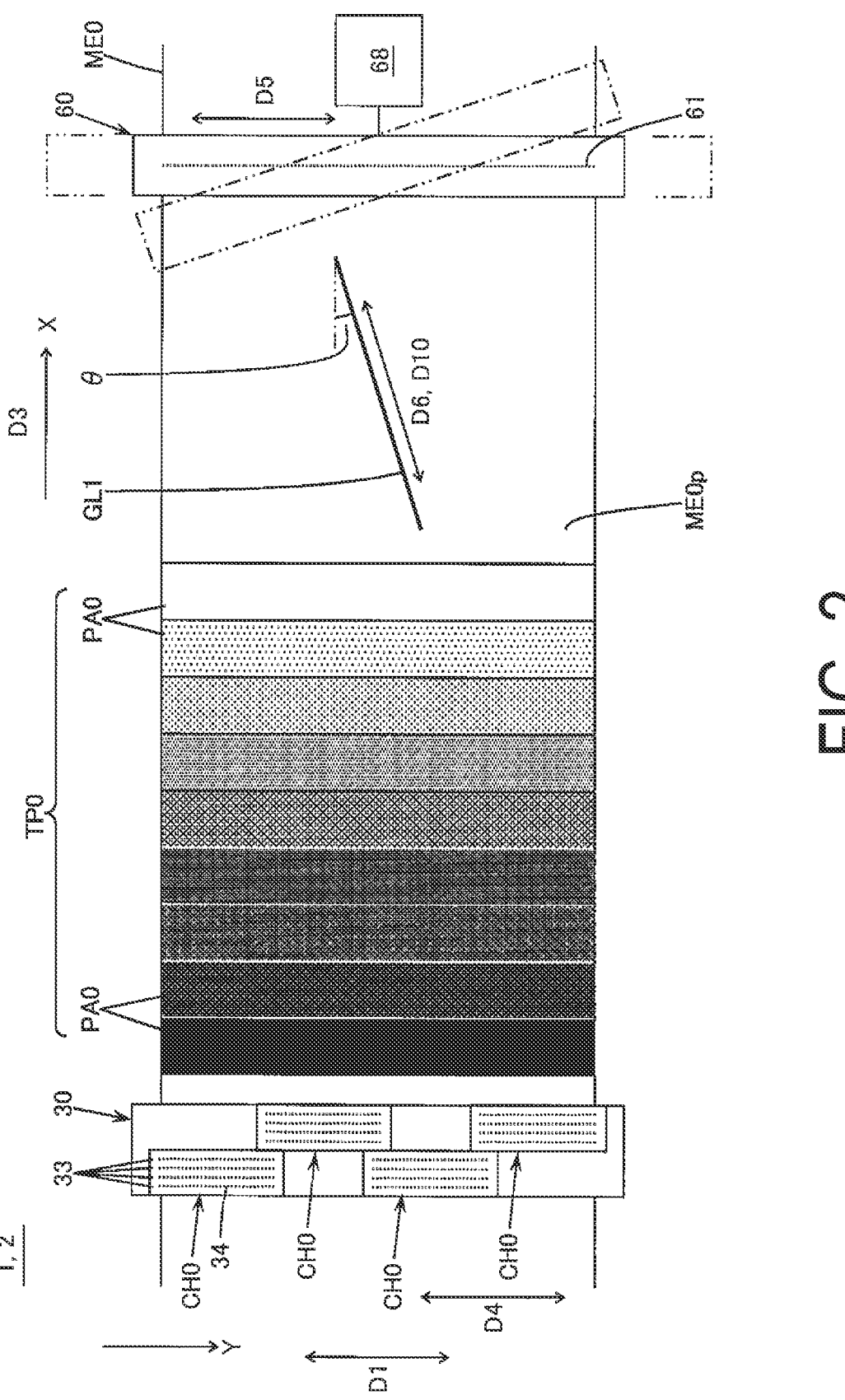
FIG. 2 is a plan view schematically illustrating an example of the printing apparatus and a test pattern.
Figure 5:
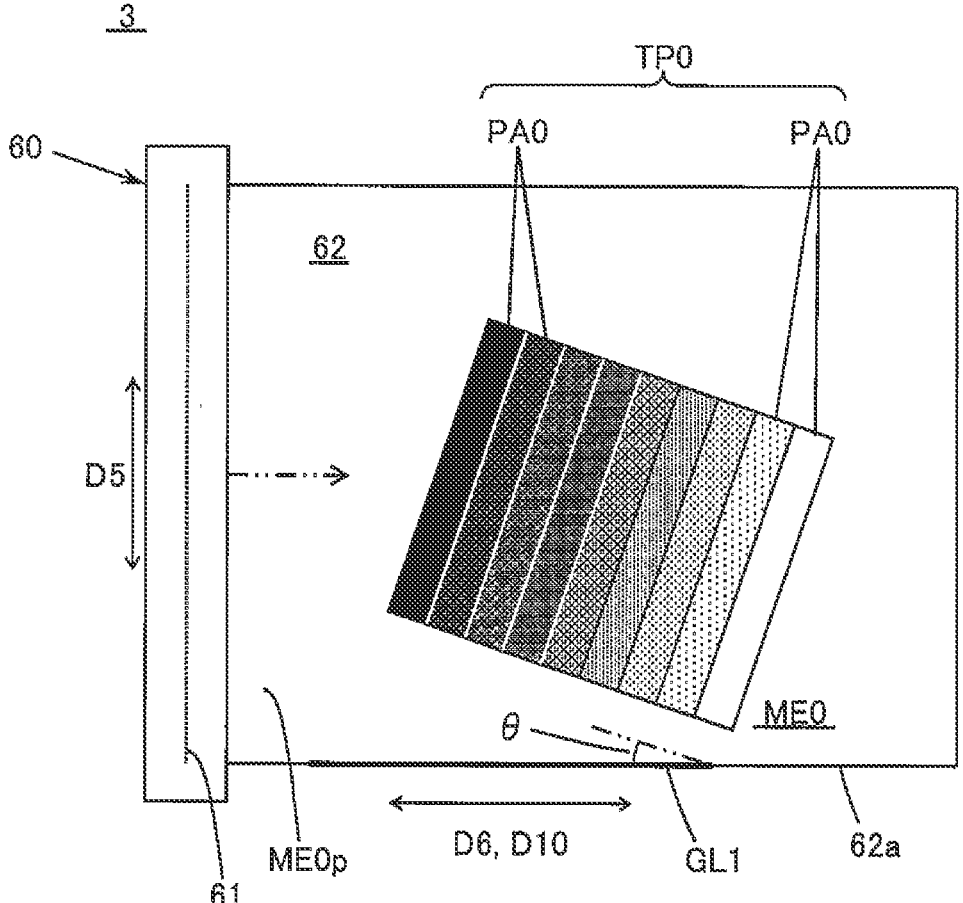
FIG. 5 is a plan view schematically illustrating an example in which a reading unit reads a test pattern in accordance with a guide line.
Figure 7:
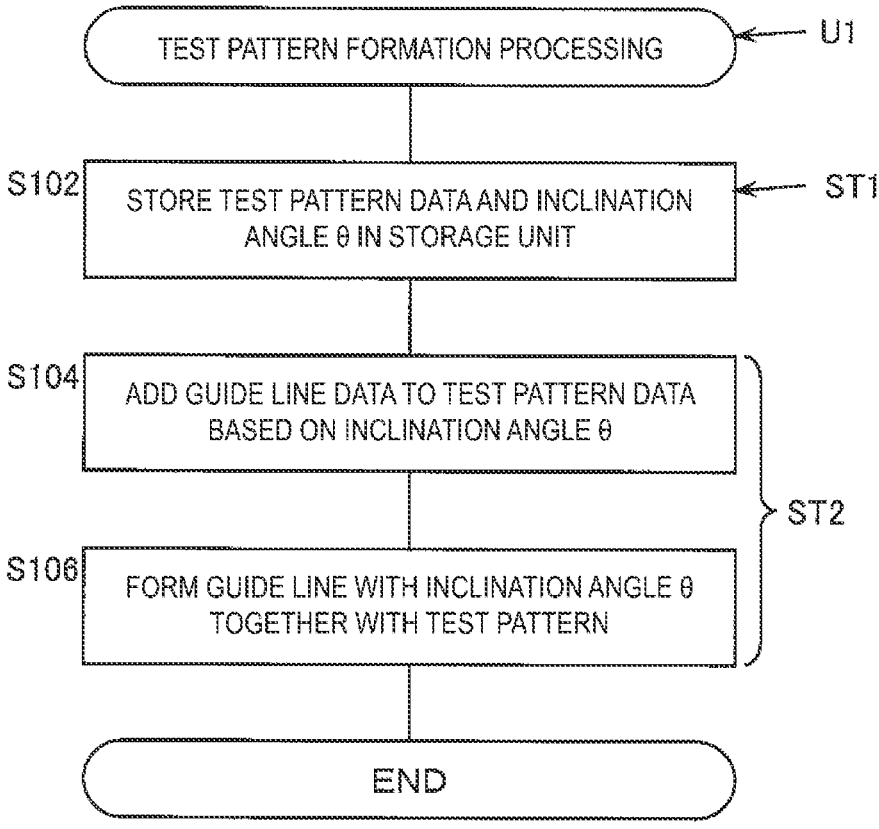
FIG. 7 is a flowchart schematically showing an example of test pattern formation processing.

As illustrated in FIGS. 2, 5, and 7, the control unit U1 may control the movement and ejection of the droplet 37 so that a guide line GL1 for causing the reading unit 60 to read the test pattern TP0 in a state where the reading direction D10 is inclined by the inclination angle θ from the scanning direction (D3) is formed on the medium ME0 together with the test pattern TP0.

In the above case, by causing the reading unit 60 to read the test pattern TP0 in accordance with the guide line GL1, it is possible to easily reduce the influence of moire when reading the test pattern. Note that in FIG. 2, the guide line GL is arranged along the feeding direction D3 with respect to the test pattern TP0, but the guide line GL may be arranged outside in the width direction D1. FIG. 5 and subsequent figures illustrating the test pattern TP0 illustrate an example in which the guide line GL is arranged outside in the width direction D1.

Aspect 3

Figure 9:
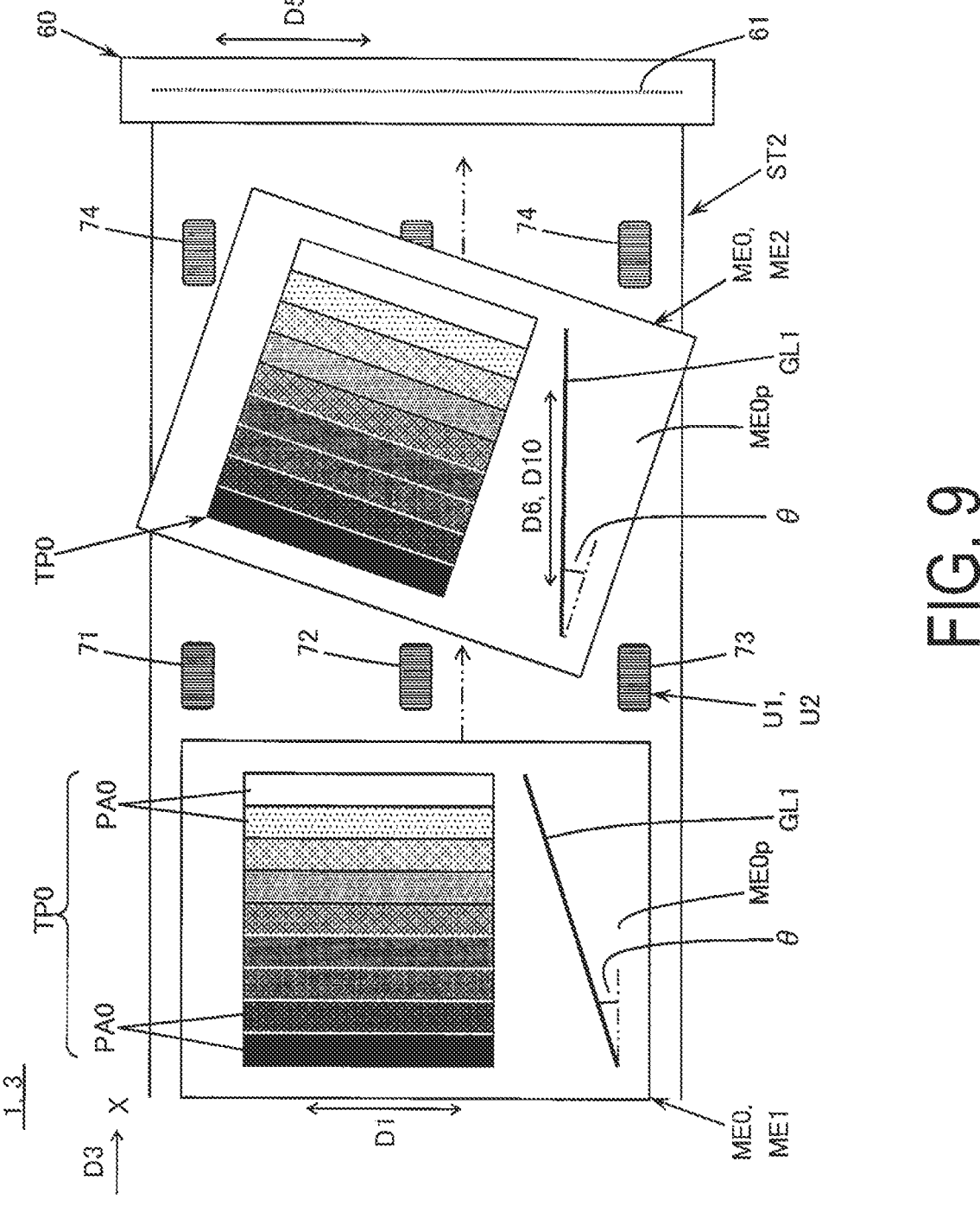
FIG. 9 is a plan view schematically illustrating an example in which a medium is inclined such that a reading direction is inclined by an inclination angle θ from a scanning direction at the time of printing during conveyance of the medium having the test pattern.

As illustrated in FIG. 9, the control unit U1 may include an inclination processing unit U2 that inclines the medium ME0 such that the reading direction D10 is inclined by the inclination angle θ from the scanning direction (D3) when the medium ME0 having the test pattern TP0 is conveyed to the reading unit 60. The inclination processing unit U2 may detect the guide line GL1 from the printing surface ME0p and incline the medium ME0 in accordance with the detected guide line GL1.

In the above case, the medium ME0 having the test pattern TP0 is automatically inclined and conveyed to the reading unit 60 so as to reduce the influence of moire, and thus the influence of moire can be easily reduced when reading the test pattern.

Aspect 4

Figure 10:
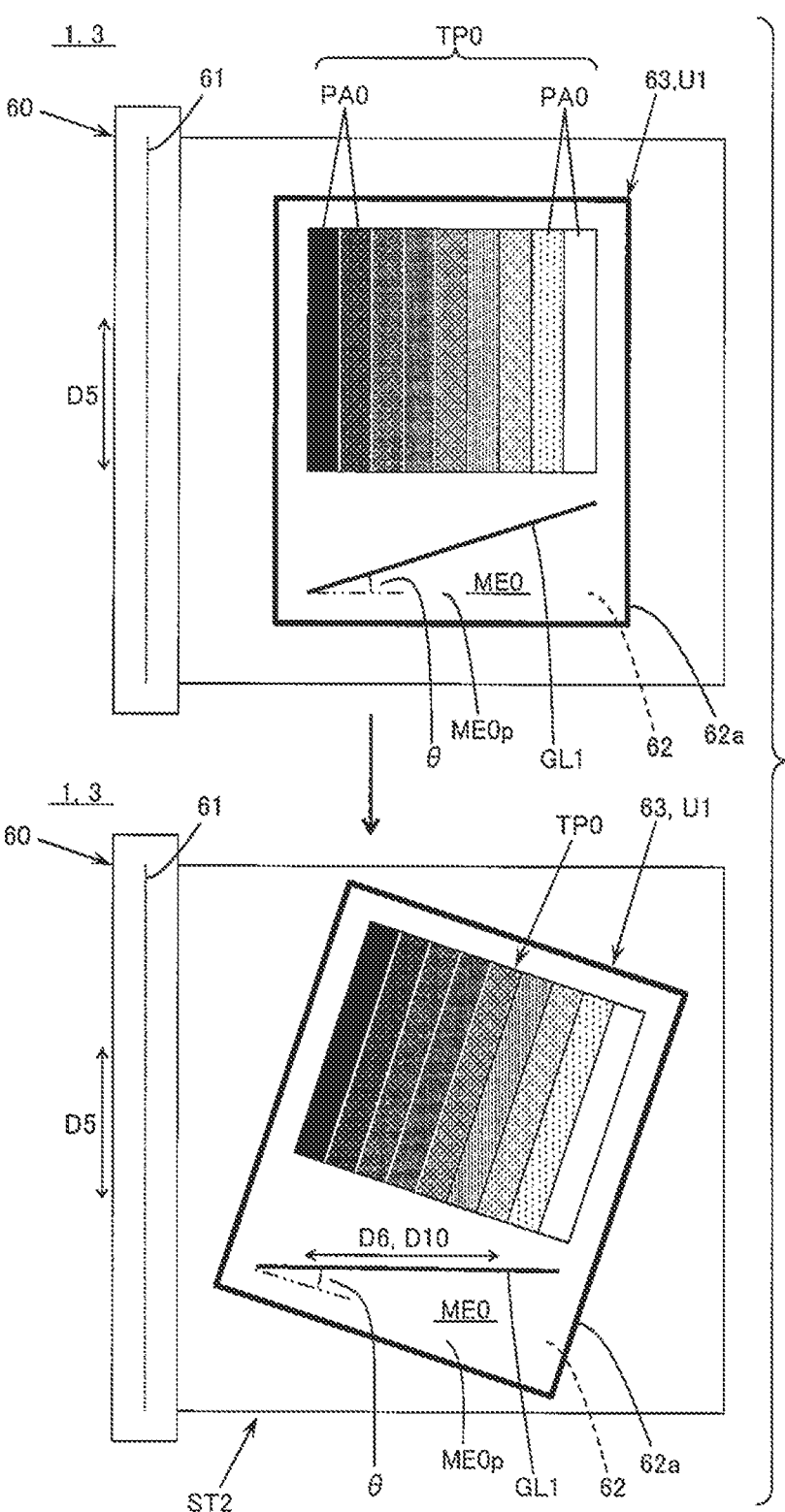
FIG. 10 is a plan view schematically illustrating an example of a flatbed reading unit including a guide that determines an orientation of a medium such that the reading direction is inclined at the inclination angle θ from the scanning direction.
Figure 11:
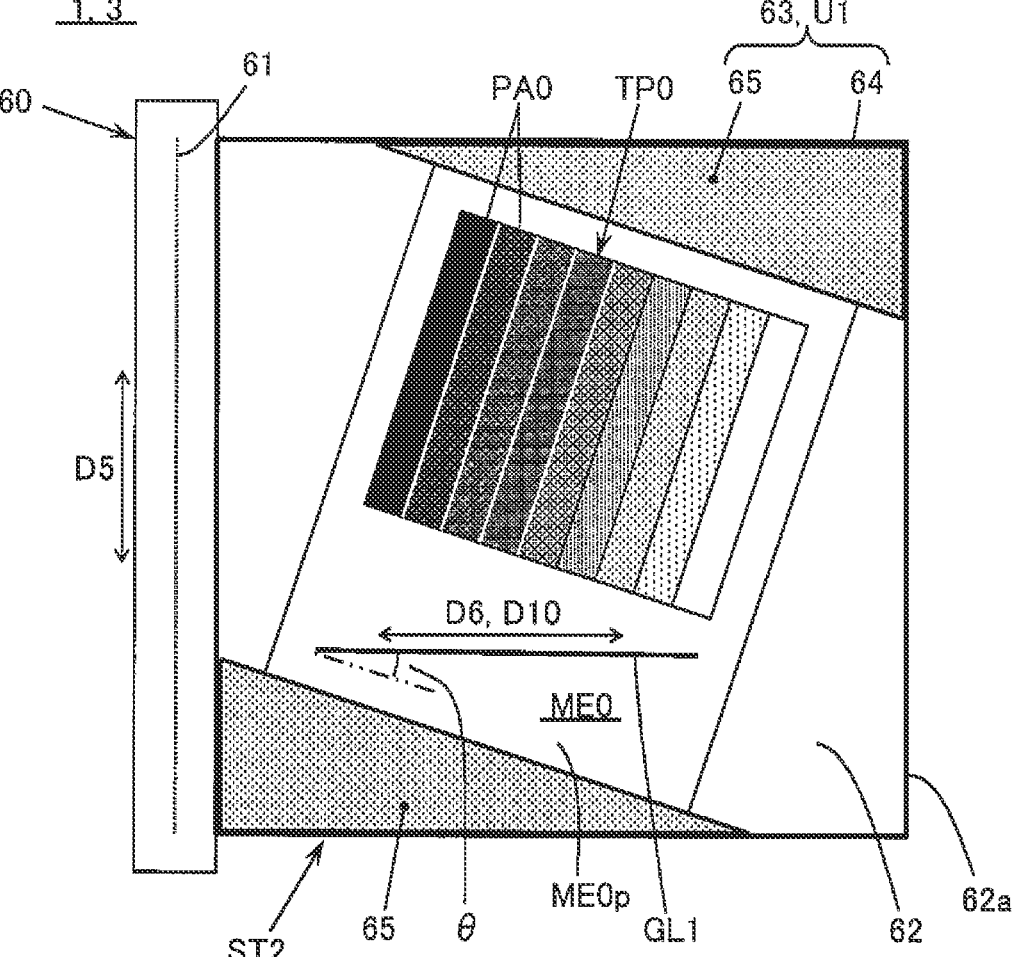
FIG. 11 is a plan view schematically illustrating an example of a flatbed reading unit including a jig that determines an orientation of a medium such that the reading direction is inclined at the inclination angle θ from the scanning direction.

As illustrated in FIGS. 10 and 11, the reading unit 60 may include a medium placement unit 62 on which the medium ME0 is placed. The reading unit 60 may include a plurality of reading elements 61 that read the density of the printing surface ME0p on the medium ME0 while moving in at least one of the first reading direction (D5) and the second reading direction (D6). The control unit U1 may include a guide 63 that determines the orientation of the medium ME0 to be placed on the medium placement unit 62 so that the reading direction D10 is inclined by the inclination angle θ from the scanning direction (D3) when the test pattern TP0 existing on the medium ME0 placed on the medium placement unit 62 is read by the plurality of reading elements 61.

In the above case, the medium ME0 having the test pattern TP0 is inclined so as to reduce the influence of moire and read by the plurality of reading elements 61, and thus the influence of moire can be easily reduced when reading the test pattern.

Aspect 5

As illustrated in FIG. 7 to 11, a reading method according to one aspect of the present technology is a reading method for moving, along the scanning direction (D3) intersecting the alignment direction D4 of the plurality of nozzles 34 configured to eject the droplet 37 to the medium ME0, at least one of the medium ME0 and the printing head 30 having the nozzle row 33 in which the plurality of nozzles 34 are aligned, ejecting the droplet 37 from the printing head 30, forming the test pattern TP0 for correcting a printing characteristic on the medium ME0, and correcting the printing characteristic based on a reading result of the test pattern TP0 by the reading unit 60 that reads the density of the printing surface ME0p in the medium ME0 in units of reading resolution in the first reading direction (D5) and the second reading direction (D6) intersecting the first reading direction (D5), the reading method including the following steps.

(A1) A storing step ST1 for the storage unit 23 to store the inclination angle θ that satisfies 0°<θ<90° along the printing surface ME0p of the reading direction D10 that serves as a reference of inclination from the scanning direction (D3) of the first reading direction (D5) and the second reading direction (D6), and the scanning direction (D3).

(A2) A reading step ST2 for the reading unit 60 to read the test pattern TP0 in a state where the reading direction D10 is inclined by the inclination angle θ from the scanning direction (D3).

The above aspect can provide a reading method configured to reduce the influence of moire when reading a printed test pattern.

Aspect 6

Furthermore, a reading apparatus 3 according to one aspect of the present technology is the reading apparatus 3 that reads the test pattern TP0 formed by the printing apparatus 1 that includes the printing head 30 and the control unit U1 and forms the test pattern TP0 for correcting a printing characteristic, and includes the reading unit 60, a conveyance unit 50, and the inclination processing unit U2 (see FIG. 9). The reading unit 60 reads the density of the printing surface ME0p on the medium ME0 in units of reading resolution in the first reading direction (D5) and the second reading direction (D6) intersecting the first reading direction (D5). The conveyance unit 50 conveys the medium ME0 having the test pattern TP0 to the reading unit 60. When the medium ME0 is conveyed to the reading unit 60, the inclination processing unit U2 inclines the medium ME0 such that the reading direction D10 that serves as a reference of inclination from the scanning direction (D3) of the first reading direction (D5) and the second reading direction (D6) is inclined by the inclination angle θ (0°<θ<90°) along the printing surface ME0p from the scanning direction (D3).

When the medium ME0 is conveyed to the reading unit 60, the inclination processing unit U2 intentionally inclines the medium ME0 so that the reading direction D10 is inclined by the inclination angle θ (0°<θ<90°) along the printing surface ME0$p$ from the scanning direction (D3). This makes the above-described moire less likely to occur in the test pattern TP0 to be read. Therefore, the above aspect can provide a reading apparatus configured to reduce the influence of moire when reading a printed test pattern.

Aspect 7

Furthermore, a reading apparatus 3 according to one aspect of the present technology is the reading apparatus 3 that reads the test pattern TP0 formed by the printing apparatus 1 that includes the printing head 30 and the control unit U1 and forms the test pattern TP0 for correcting a printing characteristic, and includes the medium placement unit 62 on which the medium ME0 is placed, the plurality of reading elements 61, and the guide 63 (see FIGS. 10 and 11). The plurality of reading elements 61 read the density of the printing surface ME0$p$ on the medium ME0 while moving in at least one of the first reading direction (D5) and the second reading direction (D6) intersecting the first reading direction (D5). When the test pattern TP0 on the medium ME0 placed on the medium placement unit 62 is read by the plurality of reading elements 61, the guide 63 determines the orientation of the medium ME0 to be placed on the medium placement unit 62 so that the reading direction D10 that serves as a reference of inclination from the scanning direction (D3) of the first reading direction (D5) and the second reading direction (D6) is inclined by the inclination angle $\theta$ ($0°<\theta<90°$) along the printing surface ME0$p$ from the scanning direction (D3).

The guide 63 intentionally determines the orientation of the medium ME0 so that the reading direction D10 is inclined at the inclination angle $\theta$ ($0°<\theta<90°$) along the printing surface ME0$p$ from the scanning direction (D3) when the test pattern TP0 on the medium ME0 placed on the medium placement unit 62 is read by the plurality of reading elements 61. This makes the above-described moire less likely to occur in the test pattern TP0 to be read. Therefore, the above aspect can provide a reading apparatus configured to reduce the influence of moire when reading a printed test pattern.

Furthermore, the present technology can be applied to a printing system including the above-described printing apparatus, a reading printing system including the above-described reading apparatus, a control method for the above-described printing apparatus, a control method for the above-described reading apparatus, a control program of the above-described printing apparatus, a control program of the above-described reading apparatus, and a computer-readable recording medium recording any of the above-described control programs. The above-described printing apparatus may be configured by a plurality of dispersed parts, and the above-described reading apparatus may be configured by a plurality of dispersed parts.

(2) First Specific Example of Printing Apparatus Including Reading Apparatus

FIG. 1 schematically illustrates the printing apparatus 1 including the reading apparatus 3. The printing apparatus 1 may be a printer 2 itself containing the reading unit 60 (reading apparatus 3), may be a combination of the printer 2 and a host apparatus HO1, may be a combination of the printer 2 and the reading apparatus 3, or may be a combination of the printer 2, the reading apparatus 3, and the host apparatus HO1. The printer 2 illustrated in FIG. 1 is a line printer that is a type of inkjet printer that ejects an ink droplet as the droplet 37. Note that the printing apparatus 1 may include an additional element not illustrated in FIG. 1. FIG.

Figure 3:
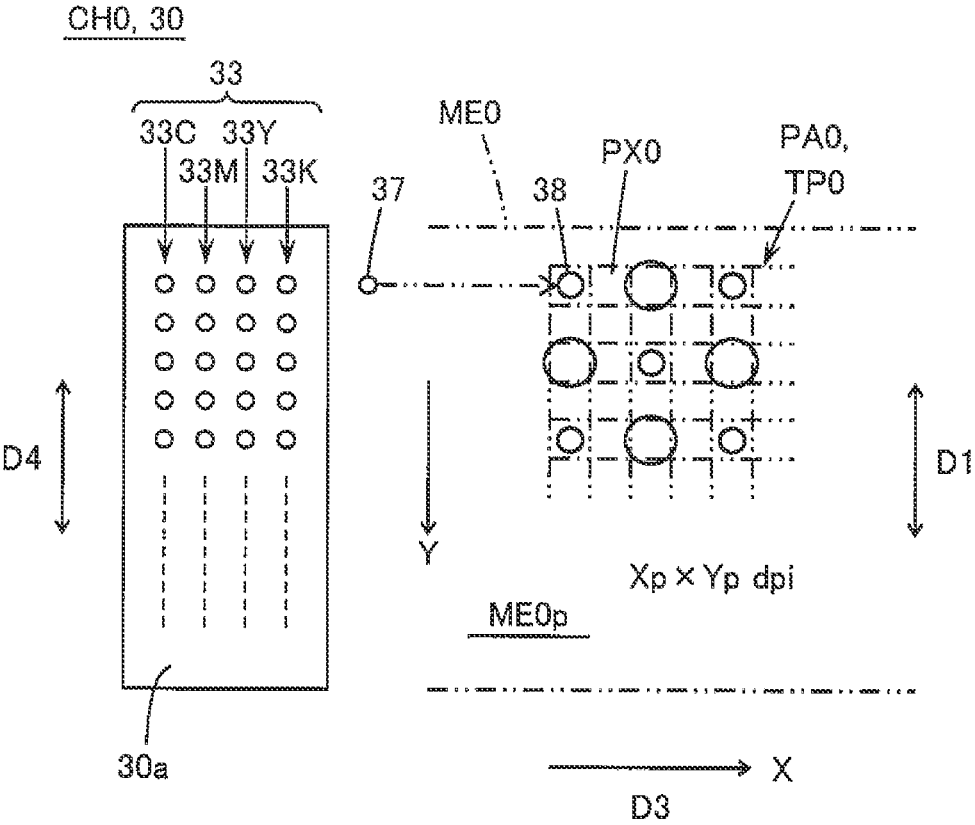
FIG. 3 is a view schematically illustrating an example of a nozzle surface of a printing head and a dot pattern on a medium.
Figure 4:
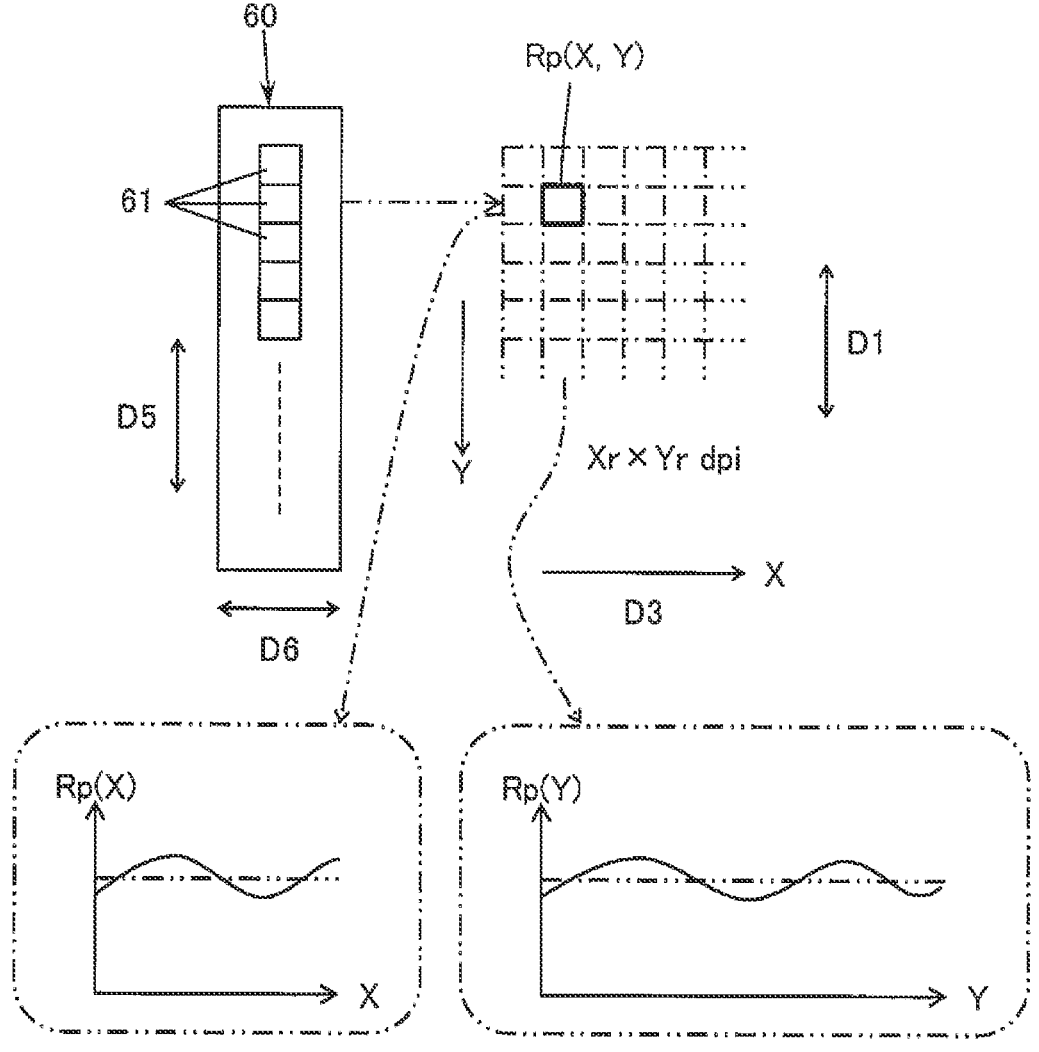
FIG. 4 is a view schematically illustrating an example of a read density value Rp (X, Y) of a test pattern.

2 is a view schematically illustrating an example of the printing apparatus 1 and the test pattern TP0. The test pattern TP0 illustrated in FIG. 2 corresponds to all the nozzles 34. FIG. 3 is a view schematically illustrating an example of a nozzle surface 30$a$ of the printing head 30 and a dot pattern on the medium ME0. FIG. 4 is a view schematically illustrating an example of the read density value Rp (X, Y) of the test pattern TP0. For convenience, the X direction is a direction along the feeding direction D3, and the Y direction is a direction along the width direction D1. The left lower part of FIG. 4 illustrates an example of moire of the read density value Rp (X) along the X direction at a certain Y position. The right lower part of FIG. 4 illustrates an example of moire of the read density value Rp (Y) along the Y direction at a certain X position.

The printer 2 illustrated in FIG. 1 includes a controller 10, a RAM 21, which is a semiconductor memory, a communication I/F 22, the storage unit 23, an operation panel 24, the printing head 30, the conveyance unit 50, and the reading unit 60. Here, the RAM is an abbreviation for random access memory, and I/F is an abbreviation for interface. The controller 10 is an example of the control unit U1. The controller 10, the RAM 21, the communication I/F 22, the storage unit 23, and the operation panel 24 are coupled to a bus and are configured to input and output information to and from one another.

The controller 10 includes a CPU 11, which is a processor, a color conversion unit 12, a halftone processing unit 13, and a drive signal transmission unit 15. Here, the CPU is an abbreviation for central processing unit. The controller 10 controls the conveyance unit 50 and the printing head 30 such that a printing image IMO is formed on the printing surface ME0$p$ of the medium ME0 based on original image data DA1 acquired from any of the host apparatus HO1, a memory card not illustrated, and the like. RGB data having an integer value of $2^8$ gradations or $2^{16}$ gradations of R, G, and B for each pixel, for example, can be applied to the original image data DA1. Here, R means red, G means green, and B means blue.

The controller 10 can be configured of an SoC or the like. Here, SoC is an abbreviation for system on a chip.

The CPU 11 is an apparatus that mainly performs information processing and control in the printer 2.

With reference to, for example, a color conversion LUT that defines a correspondence relationship between R, G, and B gradation values and C, M, Y, and K gradation values, the color conversion unit 12 converts RGB data into ink amount data DA2 having an integer value of $2^8$ gradations or $2^{16}$ gradations of C, M, Y, and K for each pixel. Here, C means cyan, M means magenta, Y means yellow, K means black, and LUT is an abbreviation for look-up table. The ink amount data DA2 represents a use amount of liquids 36 of C, M, Y, and K in units of a pixel PX0 illustrated in FIG. 3. When the resolution of the RGB data is different from a printing resolution Xp×Yp dpi, the color conversion unit 12 first converts the resolution of the RGB data into the printing resolution Xp×Yp dpi, or converts the resolution of the ink amount data DA2 into the printing resolution Xp×Yp dpi. FIG. 3 illustrates that the printing resolution is Xp×Yp dpi, i.e., the printing resolution in the X direction along the feeding direction D3 is Xp dpi, and the printing resolution in the Y direction along the width direction D1 is Yp dpi.

The halftone processing unit 13 generates dot data DA3 by reducing the number of gradations of the gradation value by performing halftone processing by any of a dither method, an error diffusion method, or the like on the gradation value of each pixel PX0 constituting the ink amount data DA2. The dot data DA3 represents a formation state of a dot 38 of the droplet 37 in units of pixels PX0. The dot data DA3 may be binary data indicating whether a dot is formed, or may be multiple-value data of three or more gradations that can correspond to dots with different sizes, such as small, medium, and large dots.

The drive signal transmission unit 15 generates a drive signal SG1 from the dot data DA3 and outputs it to a drive circuit 31 of the printing head 30. The drive signal SG1 corresponds to a voltage signal applied to a drive element 32 of the printing head 30. For example, when the dot data DA3 is "dot formation", the drive signal transmission unit 15 outputs the drive signal SG1 for ejecting a droplet for dot formation. When the dot data DA3 is quaternary data, the drive signal transmission unit 15 outputs the drive signal SG1 for ejecting a droplet for a large dot when the dot data DA3 is "large dot formation", outputs the drive signal SG1 for ejecting a droplet for a medium dot when the dot data DA3 is "medium dot formation", and outputs the drive signal SG1 for ejecting a droplet for a small dot when the dot data DA3 is "small dot formation".

The above-described units 11, 12, 13 and 15 may be configured of ASIC, and may directly read data of processing target from the RAM 21 and directly write processed data to the RAM 21. Here, ASIC is an abbreviation for application specific integrated circuit.

The printing head 30 is arranged upstream of the reading unit 60. As illustrated in FIGS. 1 to 3, the printing head 30 includes, at the nozzle surface 30a, the nozzle row 33 in which the plurality of nozzles 34 configured to eject the droplet 37 to the medium ME0 are aligned at an interval of a predetermined nozzle pitch in the alignment direction D4. Here, the nozzle means a small hole through which a droplet is jetted, and the nozzle row means an alignment of a plurality of nozzles. The nozzle surface 30a is an ejection surface of the droplet 37. As illustrated in FIG. 2, the printing head 30 includes a plurality of chips CH0 in which the plurality of nozzles 34 are successively aligned over the entire width direction D1 orthogonal to the feeding direction D3 of the medium ME0. As illustrated in FIG. 3, each of the chips CH0 includes the plurality of nozzle rows 33. The plurality of nozzle rows 33 include a cyan nozzle row 33C for ejecting the droplet 37 of C, a magenta nozzle row 33M for ejecting the droplet 37 of M, a yellow nozzle row 33Y for ejecting the droplet 37 of Y, and a black nozzle row 33K for ejecting the droplet 37 of K. Each of the droplets 37 is ejected from the nozzle 34 targeting at the pixel PX0 of the medium ME0. Of course, the dot 38 of C is formed from the droplet 37 of C on the medium ME0, the dot 38 of M is formed from the droplet 37 of M on the medium ME0, the dot 38 of Y is formed from the droplet 37 of Y on the medium ME0, and the dot 38 of K is formed from the droplet 37 of K on the medium ME0. Each of the nozzle rows 33 ejects the droplet 37 toward the medium ME0. The plurality of nozzles 34 included in each of the nozzle rows 33 may be aligned in a single row, or may be aligned in a staggered pattern, i.e., in two rows. The alignment direction D4 of the plurality of nozzles 34 included in the nozzle row 33 may be the width direction D1, or may be shifted from the width direction D1 as long as it is different from the feeding direction D3.

The printing head 30 may include the nozzle row 33 that is movable in both directions along the width direction D1 of the medium ME0 and in which the plurality of nozzles 34 are aligned in an orientation intersecting the width direction D1 of the medium ME0. In this case, the scanning direction intersecting the alignment direction D4 of the nozzles 34 is the width direction D1 of the medium ME0. The alignment direction D4 of the nozzles 34 at this time may be the feeding direction D3, or may be shifted from the feeding direction D3 as long as it is different from the width direction D1.

The conveyance unit 50 controlled by the controller 10 feeds the medium ME0 to the feeding direction D3 along a conveyance path 59 by driving of a roller drive unit 55. In FIG. 1, the feeding direction D3 is a right direction, a left side is called upstream, and a right side is called downstream. The feeding direction D3 is an example of the scanning direction intersecting the alignment direction D4 of the plurality of nozzles 34, and is a direction orthogonal to the alignment direction D4, for example. The roller drive unit 55 includes a conveyance roller pair 56 and a discharge roller pair 57. The roller drive unit 55 includes a servomotor, and feeds the medium ME0 to the feeding direction D3 at a constant speed by rotating at a constant speed a drive conveyance roller of the conveyance roller pair 56 and a drive discharge roller of the discharge roller pair 57 under the control of the controller 10. Therefore, it can be said that the conveyance unit 50 moves at least one of the medium ME0 and the printing head 30 along the feeding direction D3, and it can be said that the control unit U1 controls movement of at least one of the medium ME0 and the printing head 30 in the feeding direction D3. Since the reading unit 60 is arranged downstream of the printing head 30, it can be said that the conveyance unit 50 moves at least one of the medium ME0 and the printing head 30 such that the medium ME0 is changed from a position facing the printing head 30 to a position facing the reading unit 60.

The medium ME0 is a printed matter that holds a printing image. The material of the medium ME0 is not particularly limited, and various materials such as resin, metal, and paper can be considered. A shape of the medium ME0 is also not particularly limited, and various shapes such as a rectangle and a roll shape can be considered, and a three-dimensional shape may be used.

A platen 58 is below the conveyance path 59 and supports the medium ME0 by coming into contact with the medium ME0 present on the conveyance path 59. The printing head 30 to be controlled by the controller 10 includes the drive circuit 31 and the drive element 32, and attaches the liquid 36 to the medium ME0 by ejecting the droplet 37 toward the medium ME0 supported by the platen 58. Therefore, it can be said that the control unit U1 controls ejection of the droplet 37 from the printing head 30.

The drive circuit 31 applies a voltage signal to the drive element 32 according to the drive signal SG1 input from the drive signal transmission unit 15. The drive element 32 may be a piezoelectric element that applies pressure to the liquid 36 inside a pressure chamber communicating with the nozzle 34, may be a drive element that ejects the droplet 37 from the nozzle 34 by generating a bubble inside the pressure chamber with heat, or the like. The pressure chamber of the printing head 30 is supplied with the liquid 36 from a liquid cartridge 35. The liquid 36 in the pressure chamber is ejected as the droplet 37 toward the medium ME0 from the nozzle 34 by the drive element 32. Due to this, the dot 38 of the droplet 37 is formed on the printing surface ME0p of the medium ME0, the printing image IMO expressed by a pattern of the dot 38 is formed on the printing surface ME0p of the medium ME0. Note that the liquid cartridge 35 here refers to a member configured to hold the liquid 36 supplied to the pressure chamber. Therefore, the ink to be supplied is not limited to that supplied from an ink cartridge. For example, an ink tank of the printer 2 may be interpreted as a liquid cartridge, and may be an ink tank type that directly supplies ink to the ink tank.

The RAM 21 stores the original image data DA1 and the like received from the host apparatus HO1, a memory (not illustrated), or the like. The communication I/F 22 is connected to the host apparatus HO1 by wire or wirelessly, and inputs and outputs information to and from the host apparatus HO1. The host apparatus HO1 includes a computer such as a personal computer or a tablet terminal, a mobile phone such as a smartphone, a digital camera, and a digital video camera. The storage unit 23 stores the test pattern data TD1 used in formation of the test pattern TP0 for correcting the printing characteristic, the inclination angle θ of the test pattern TP0 at the time of reading, and the like. The storage unit 23 may be a nonvolatile semiconductor memory such as a flash memory, a magnetic storage apparatus such as a hard disk, or the like. The operation panel 24 includes an output unit 25 such as a liquid crystal panel that displays information, and an input unit 26 such as a touchscreen that receives an operation onto a display screen.

The controller 10 controls ejection of the droplet 37 so as to form, on the medium ME0, the test pattern TP0 for correcting the density of the printing image IMO based on the test pattern data TD1. The controller 10 corrects the density of the printing image IMO based on the reading result of the test pattern TP0 by the reading unit 60. The density of the printing image IMO is an example of the printing characteristic. As illustrated in FIG. 2, the test pattern TP0 includes patches PA0 of a plurality of levels of density aligned in the feeding direction D3. Each of the patches PA0 has an elongated rectangular shape of which the long direction faces the width direction D1 so as to be able to correct an ejection amount of the liquid 36 from all the nozzles 34 used in printing, e.g., an ink ejection amount. The test pattern TP0 may have a single color such as an achromatic color, or may be provided for each color of C, M, Y, and K. The reading unit 60 reads the density of the printing surface ME0p on the medium ME0 in units of the reading resolution. FIG. 4 illustrates that the reading resolution is Xr×Yr dpi, i.e., the reading resolution in the X direction along the feeding direction D3 is Xr dpi, and the reading resolution in the Y direction along the width direction D1 is Yr dpi.

The reading unit 60 includes the plurality of reading elements 61 aligned so as to be a reading resolution Yr along the element alignment direction D5 intersecting the feeding direction D3, and reads the density of the printing surface ME0p by the plurality of reading elements 61. The element alignment direction D5 is an example of the first reading direction. The reading unit 60 reads the density of the printing surface ME0p on the medium ME0 in units of reading resolution in the element alignment direction D5 and the movement direction D6 intersecting the element alignment direction D5. The movement direction D6 is an example of the second reading direction. The element alignment direction D5 illustrated in FIGS. 2 and 4 is orthogonal to the feeding direction D3. The element alignment direction D5 may be the width direction D1, may be shifted from the width direction D1 as long as it is different from the feeding direction D3, may be the alignment direction D4 of the nozzles 34, or may be shifted from the alignment direction D4 as long as it is different from the feeding direction D3. The reading unit 60 is arranged downstream of the printing head 30. The reading unit 60 may be an image sensor of a contact image sensor, which is abbreviated as CIS, an image sensor of a charge coupled devices, which is abbreviated as CCD, a CMOS image sensor, and a solid imaging element such as a line sensor or an area sensor including CCD, or the like. Here, CMOS is an abbreviation for complementary metal-oxide semiconductor. CIS image sensors widely used in recent years are inexpensive and can achieve downsizing, but easily cause moire of the read density in comparison with CCD sensors. The present specific example is suitable when the reading unit 60 is a CIS image sensor.

When the reading unit 60 is a CIS image sensor, it includes a light-emitting diode, a lens, and the plurality of reading elements 61. The light-emitting diode may include three types, namely, a red light-emitting diode that emits red light, a green light-emitting diode that emits green light, and a blue light-emitting diode that emits blue light. The light-emitting diode applies light to the printing surface ME0p of the medium ME0 to be conveyed in the feeding direction D3. The light applied to the printing surface ME0p from the light-emitting diode is reflected by the printing surface ME0p to reach the plurality of reading elements 61 through the lens, and measured at each of the reading elements 61. The arrangement density of the reading elements 61 is adapted to the reading resolution Yr in the Y direction, and is not limited, and for example, may be equivalent to 300 to 600 dpi. The reading resolution Xr in the X direction is set in accordance with the read timing of each of the reading elements 61, and is not limited, and for example, may be equivalent to 300 to 600 dpi. The reading unit 60 of the present specific example includes an analog/digital conversion circuit that converts an analog amount of a detection voltage of each of the reading elements 61 into a digital value, and an analog density amount corresponding to the detection voltage of each of the reading elements 61 is converted into a digital density value at the analog/digital conversion circuit and is output to the controller 10.

As illustrated in FIG. 3, the printing head 30 ejects the droplet 37 from the plurality of nozzles 34 in units of the printing resolution Xp×Yp such that the test pattern TP0 is formed on the printing surface ME0p of the medium ME0 moving in the feeding direction D3. The patch PA0 included in the test pattern TP0 has a constant density in its entirety, and thus includes a dot pattern with a periodic structure. As illustrated in FIG. 4, the reading unit 60 reads the density of the printing surface ME0p in units of the reading resolution Xr×Yr. Therefore, the reading unit 60 includes a periodic structure corresponding to the reading resolution Xr×Yr. If no error occurs between the dot pattern formed on the printing surface ME0p and the reading pitch by the reading unit 60, no moire occurs in the read density value Rp (X, Y). Actually, an error occurs between the dot pattern and the reading pitch, and thus moire of the read density value Rp (X, Y) by interference between the arrangement of the plurality of dots 38 included in the test pattern TP0 and the reading resolution Xr×Yr in the reading unit 60 is likely to occur. In particular, if the printing resolution Xp and the reading resolution Xr have an integral multiple relationship such as 1:1, or if the printing resolution Yp and the reading resolution Yr have an integral multiple relationship such as 1:1, moire easily occurs in the read density value Rp (X, Y). If the alignment direction D4 of the nozzles 34 is slightly shifted from the reference or the element alignment direction D5 is slightly shifted from the reference, moire having a period much larger than the unit of the reading resolution Xr×Yr is likely to occur in the read density value Rp (X, Y).

When the patch PA0 with a constant density is read, the read density value Rp (X) along the X direction and the read density value Rp (Y) along the Y direction are supposed to be substantially constant as indicated by the two-dot chain line in the left lower part and the right lower part in FIG. 4 unless moire occurs. The reason for the expression "substantially constant" is that in some cases the read value of each of the reading elements 61 contains minute noise. When moire occurs in the read density (Rp (X), Rp (Y)), a periodic change larger than minute noise occurs in the read density (Rp (X), Rp (Y)). In other words, when moire occurs in the read density (Rp (X, Y)), a periodic change larger than minute noise occurs in the read density (Rp (X, Y)). When moire occurs in the read density (Rp (X, Y)), an error occurs in the reading result of the test pattern TP0, and as a result, an error originating from the moire occurs in a correction value of the liquid ejection amount such as the ink ejection amount. In view of this, it is desirable to reduce the influence of moire when reading the test pattern TP0.

A test was conducted to find that when the orientation of the reading resolution Xr×Yr is greatly inclined from the orientation of the printing resolution Xp×Yp along the printing surface ME0p, moire of the read density value Rp (X, Y) is suppressed. Note that in the present specific example, the Y direction in the reading resolution is the element alignment direction D5, and the X direction in the reading resolution is the movement direction D6 orthogonal to the element alignment direction D5. On the other hand, the Y direction in the printing resolution is the alignment direction D4 of the nozzles 34, and the X direction in the printing resolution is the feeding direction D3 orthogonal to the alignment direction D4. As illustrated in FIG. 2, when the element alignment direction D5 is close to the alignment direction D4 of the nozzles 34, the inclination angle θ (0°<θ<90°) along the printing surface ME0p of the reading resolution Xr×Yr with respect to the printing resolution Xp×Yp is an angle formed by the feeding direction D3 and the movement direction D6, and is also an angle formed by the alignment direction D4 and the element alignment direction D5. When the element alignment direction D5 is closer to the feeding direction D3, the inclination angle θ (0°<θ<90°) becomes an angle formed by the feeding direction D3 and the element alignment direction D5, and also becomes an angle formed by the alignment direction D4 of the nozzles 34 and the movement direction D6. In either case, the inclination angle θ is such an angle that the element alignment direction D5 matches neither the alignment direction D4 of the nozzles 34 nor the feeding direction D3, and the movement direction D6 matches neither the alignment direction D4 of the nozzles 34 nor the feeding direction D3. The inclination angle θ along the printing surface ME0p becomes an angle formed by the reading direction D10 that serves as a reference of inclination from the scanning direction D3 of the element alignment direction D5 and the movement direction D6, and the feeding direction D3. The inclination angle θ at which moire does not occur in the read density value Rp (X, Y) is an angle exceeding a range of errors that can occur in the dot pattern and the reading pitch.

The inclination angle θ at which moire does not occur depends on the model of the printing apparatus 1. Therefore, in the present specific example, the inclination angle θ (0°<θ<90°) at which the moire does not occur is obtained for each model of the printing apparatus 1 and stored in the storage unit 23, and the test pattern TP0 is read such that the orientation of the reading resolution Xr×Yr is intentionally inclined by the inclination angle θ from the orientation of the printing resolution Xp×Yp. The control unit U1 specifies, based on the inclination angle θ, the position of each of the patches PA0 included in the test pattern TP0, and performs processing of setting the record density at the specified position to the record density of the patch PA0.

In order to incline the relative movement direction D6 of the reading unit 60 by the inclination angle θ from the feeding direction D3, as illustrated in FIGS. 1 and 2, a reading unit drive unit 68 (see FIG. 2) may move the reading unit 60 in the element alignment direction D5 in accordance with the inclination angle θ in response to an instruction from the controller 10 (see FIG. 1). In order to incline the element alignment direction D5 by the inclination angle θ from the alignment direction D4 of the nozzles 34, the reading unit drive unit 68 may incline the reading unit 60 in accordance with the inclination angle θ in response to an instruction from the controller 10.

The controller 10 may control movement of the medium ME0 and ejection of the droplet 37 such that the guide line GL1 for causing the reading unit 60 to read the test pattern TP0 in a state where the reading direction D10 is inclined by the inclination angle θ from the feeding direction D3 is formed on the medium ME0 together with the test pattern TP0. The guide line GL1 illustrated in FIG. 2 is inclined by the inclination angle θ from the feeding direction D3.

In the above case, the controller 10 may cause the reading unit 60 to read the printing surface ME0p of the medium ME0 once, detect the guide line GL1 from the printing surface ME0p based on the reading result, and incline the reading unit 60 by the inclination angle θ in accordance with the detected guide line GL1. Thereafter, the controller 10 may cause the medium ME0 to be back fed, cause the reading unit 60 to read the test pattern TP0, and acquire the read density of each of the patches PA0 based on the reading result.

As illustrated in FIG. 5, by placing the medium ME0 on the medium placement unit 62 by aligning the guide line GL1 with an edge part 62a of the medium placement unit 62 of the reading apparatus 3 containing the reading unit 60, the reading apparatus 3 may read the test pattern TP0 in a state of being inclined by the inclination angle θ. The reading apparatus 3 illustrated in FIG. 5 includes the plurality of reading elements 61 aligned in the element alignment direction D5, and the medium placement unit 62 having a rectangular shape having the edge part 62a along the element alignment direction D5 and the movement direction D6. The plurality of reading elements 61 can move in the movement direction D6 orthogonal to the element alignment direction D5. By the plurality of reading elements 61 reading the test pattern TP0 while moving in the movement direction D6, the test pattern TP0 is read in a state of being inclined by the inclination angle θ.

Figure 6:
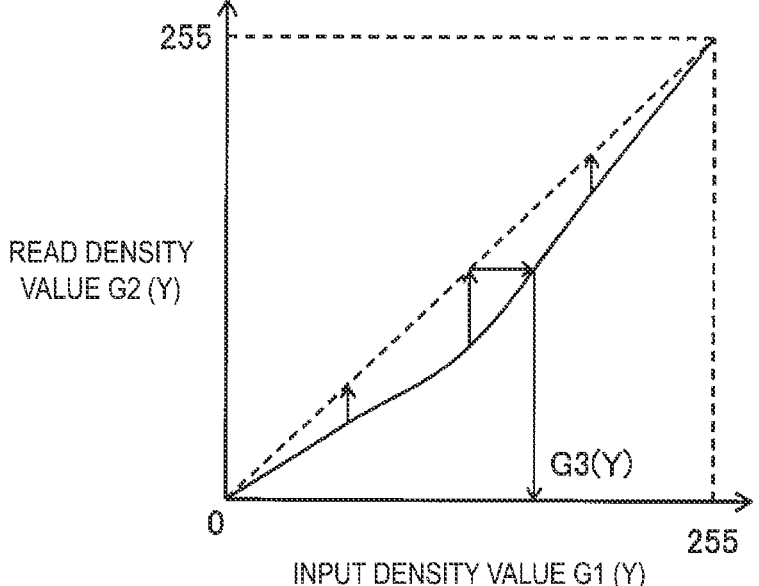
FIG. 6 is a view schematically illustrating an example of density correction in units of nozzle.

FIG. 6 schematically illustrates an example of performing density correction in units of nozzles using the read density value Rp (X, Y) at a position corresponding to each of the nozzles 34. In FIG. 6, the horizontal axis represents an input density value G1 (Y) corresponding to the test pattern data for forming the test pattern TP0, the vertical axis represents a read density value G2 (Y) at the position corresponding to the nozzle 34, and the curved line represents a correspondence relationship between the input density value G1 (Y) and the read density value G2 (Y). The position corresponding to each of the nozzles 34 in each of the patches PA0 is calculated based on the inclination angle θ with reference to the edge part 62a matched the guide line GL1 in the medium placement unit 62. The input density value G1 (Y) is a gradation value corresponding to the density of the patch PA0, and is discrete values such as 16, 32, . . . , in gradation values of 0 to 255, for example. The read density value G2 (Y) is a density value obtained from the read density value Rp (X, Y) at the position corresponding to each of the nozzles 34, and is represented by a gradation value of 0 to 255, for example.

When the test pattern TP0 including the patch PA0 of the input density value G1 (Y) in an Np level is printed, and the read density value G2 (Y) in units of nozzles is obtained based on the inclination angle θ from the read density value Rp (X, Y) of the patch PA0 of each density, a correspondence relationship such as the curved line illustrated in FIG. 6 is obtained. The density correction of the printing image IMO is performed such that the read density value G2 (Y) becomes the input density value G1 (Y) with respect to the ink amount data DA2, for example. The correction value of the density of the printing image IMO is a value for correcting the read density value G2 (Y) to the input density value G1 (Y), and may be a value representing a difference between the input density value G1 (Y) and the read density value G2 (Y), or the read density value G2 (Y) itself. As illustrated in FIG. 6, the input density value G1 (Y) corresponding to the read density value G2 (Y) may be obtained for all gradation values of 0 to 255 as a density correction value G3 (Y). In this case, the correction value of the density of the printing image IMO may be the density correction value G3 (Y).

Next, an example of test pattern formation processing of forming the test pattern TP0 on the medium ME0 together with the guide line GL1 having the inclination angle θ will be described with reference to FIG. 7. For example, upon receiving an instruction for forming the test pattern TP0 from the host apparatus HO1 or the operation panel 24, the controller 10 (see FIG. 1) as the control unit U1 starts the test pattern formation processing. Here, the controller 10 that performs the processing of step S102 performs the storing step ST1 together with the storage unit 23. The controller 10 that performs the processing of steps S104 to S106 performs a part of the reading step ST2. Hereinafter, the description of "step" will be omitted.

The processing of S104 to S106 may be performed after a lapse of a long period such as one day or more from a processing end time point of S102. When the storage unit 23 stores the test pattern data TD1 and the inclination angle θ in advance, the processing of S102 is unnecessary.

When the test pattern formation processing is started, the controller 10 acquires the test pattern data TD1 and the inclination angle θ, and stores the test pattern data TD1 and the inclination angle θ into the storage unit 23 (S102). For example, when the processing of S102 is performed by the manufacturer of the printer 2, the operator may obtain the inclination angle θ at which moire does not occur in the read density value Rp (X, Y) and store the inclination angle θ into the storage unit 23 together with the test pattern data TD1. The inclination angle θ at which moire does not occur can be an angle at which the inclination of the printed matter of the test pattern TP0 formed based on the test pattern data TD1, for example, is changed into a plurality of levels by the operator and read by the reading unit 60, and moire does not occur in the read density value Rp (X, Y). The processing of S102 may be processing in which the controller 10 downloads the test pattern data TD1 and the inclination angle θ from the server and stores them into the storage unit 23.

Next, the controller 10 reads the test pattern data TD1 and the inclination angle θ from the storage unit 23 to the RAM 21, and adds guide line data for forming the guide line GL1 of the inclination angle θ to the test pattern data TD1 (S104). Finally, the controller 10 controls movement of the medium ME0 and ejection of the droplet 37 such that the guide line GL1 is formed on the medium ME0 together with the test pattern TP0 (S106) based on the test pattern data TD1 added with the guide line data, and ends the test pattern formation processing. Then, as illustrated in FIG. 2, the printer 2 forms the guide line GL1 having the inclination angle θ together with the test pattern TP0 on the printing surface ME0*p* of the medium ME0. Therefore, as illustrated in FIG. 5, the user perform work of matching the guide line GL1 with the edge part 62*a* of the medium placement unit 62, placing the medium ME0 onto the medium placement unit 62, and causing the reading apparatus 3 to read the test pattern TP0.

Figure 8:
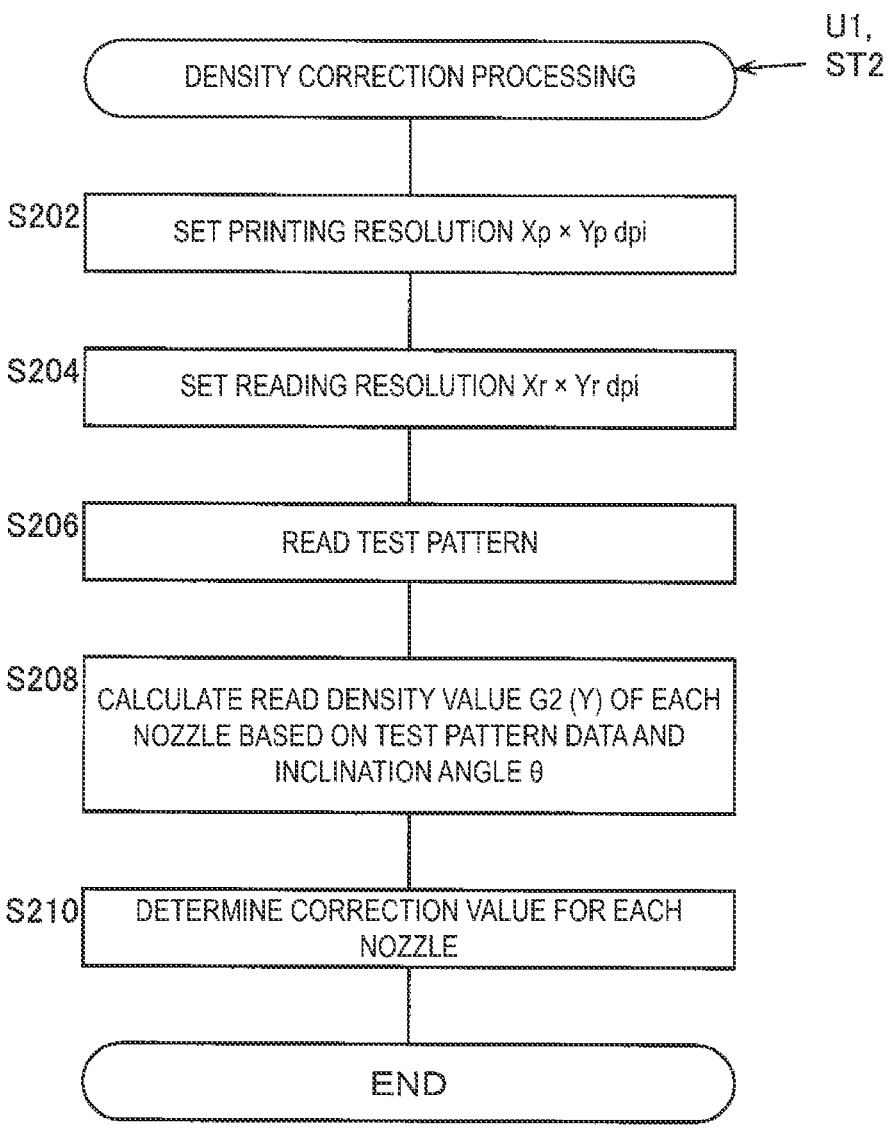
FIG. 8 is a flowchart schematically showing an example of density correction processing.

Hereinafter, an example of processing of correcting the printing characteristic will be described with reference to FIG. 8. FIG. 8 schematically illustrates density correction processing of correcting the density of the printing image IMO. The controller 10 (see FIG. 1) as the control unit U1 starts the density correction processing upon receiving an instruction of density correction, for example, using the test pattern TP0 from the host apparatus HO1 or the operation panel 24. Here, the controller 10 that performs the density correction processing performs a part of the reading step ST2. As illustrated in FIG. 5, the user is supposed to place the medium ME0 onto the medium placement unit 62 and give the host apparatus HO1 or the operation panel 24 an instruction for the density correction.

When the density correction processing is started, the controller 10 sets the printing resolution Xp×Yp dpi of the test pattern TP0 (S202). The controller 10 may receive the setting of the printing resolution Xp×Yp from the host apparatus HO1 or the operation panel 24.

Next, the controller 10 sets the reading resolution Xr×Yr dpi of the test pattern TP0 (S204). The controller 10 may receive the setting of the reading resolution Xr×Yr from the host apparatus HO1 or the operation panel 24. When the reading resolution is fixed to Xr×Yr, the processing of S204 may be omitted.

Next, the controller 10 causes the reading unit 60 to read the test pattern TP0 with the reading resolution Xr×Yr, and acquires the read density value Rp (X, Y) from the reading unit 60 (S206). As described above, since the orientation of the reading resolution Xr×Yr is inclined by the inclination angle θ from the orientation of the printing resolution Xp×Yp so that moire does not occur in the read density value Rp (X, Y), the influence of the moire is small when reading the test pattern TP0.

Next, the controller 10 calculates the read density value G2 (Y) in which the read density values Rp (X, Y) of the nozzles 34 for each of the patches PA0 is averaged based on the test pattern data TD1 including the guide line data and the inclination angle θ (S208). The position of each of the nozzles 34 for each of the patches PA0 can be specified based on the test pattern data TD1 including the guide line data and the inclination angle θ. Therefore, the controller 10 can divide the read density value Rp (X, Y) from the reading unit 60 into the read density value corresponding to the position of each of the nozzles 34 for each of the patches PA0, and can calculate the read density value G2 (Y) corresponding to the position of each of the nozzles 34 for each of the patches PA0.

Finally, the controller 10 determines a correction value of each of the nozzles 34 based on the read density value G2 (Y) of each of the nozzles 34 for each of the patches PA0 (S210). The density correction of the printing image IMO is performed such that the read density value G2 (Y) becomes the input density value G1 (Y) with respect to the ink amount data DA2 as illustrated in FIG. 6, for example. The controller 10 may obtain, for all gradation values from 0 to 255, the input density value G1 (Y) corresponding to the read density value G2 (Y) as the density correction value G3 (Y). As described above, the correction value may be a value representing a difference between the input density value G1 (Y) and the read density value G2 (Y), may be the read density value G2 (Y) itself, or may be the density correction value G3 (Y).

After the processing of S210, the controller 10 corrects the ink amount data DA2 so that the read density value G2 (Y) becomes the input density value G1 (Y) at the time of forming the printing image IMO based on the original image data DA1, thereby forming, on the medium ME0, the printing image IMO whose density has been corrected. Since the correction value of each of the nozzles 34 is based on the read density value Rp (X, Y) having a small influence of moire, the printing image IMO in which the density is accurately corrected is obtained.

As described above, the test pattern TP0 is read by the reading unit 60 in a state where the reading direction D10 is intentionally inclined by the inclination angle θ along the printing surface ME0p from the feeding direction D3. This makes moire less likely to occur in the read density value Rp (X, Y) of the test pattern TP0. Therefore, the present specific example can reduce the influence of moire when reading the test pattern TP0.

(3) Second Specific Example of Printing Apparatus Including Reading Apparatus FIG. 9 schematically illustrates the printing apparatus 1 including the inclination processing unit U2 that inclines the medium ME0 so that the reading direction D10 is inclined by the inclination angle θ from the feeding direction D3 at the time of printing during conveyance of the medium ME0 having the test pattern TP0. The reading apparatus 3 including the controller 10 performs the reading step ST2. Since the main configuration of the printing apparatus 1 including the reading apparatus 3 is the same as the configuration illustrated in FIG. 1, the description will be omitted.

The printing apparatus 1 illustrated in FIG. 9 includes rollers 71 to 74 that feed, into the feeding direction D3, a medium ME0 in a cut shape such as a cut sheet having the test pattern TP0. The inclination processing unit U2 includes the rollers 71 to 73, and inclines the medium ME0 so that the reading direction D10 is inclined by the inclination angle θ from the feeding direction D3 at the time of printing when the medium ME0 having the test pattern TP0 is conveyed to the reading unit 60. FIG. 9 illustrates, as the medium ME0, a medium ME1 before being inclined and a medium ME2 that is inclined. It is assumed that the roller 72 in the center and the roller 74 for constant speed feeding rotate at a constant speed in an orientation of feeding the medium ME0. For example, when rotating the medium ME1 before rotation clockwise by the inclination angle θ, the inclination processing unit U2 performs processing of increasing the rotation speed of the roller 71 on one end side in the width direction D1 and decreasing the rotation speed of the roller 73 on the other end side in the width direction D1 according to the inclination angle θ. The inclination processing unit U2 and the controller 10 constitute the control unit U1. The roller 74 for constant speed feeding feeds the medium ME1 before rotation and the medium ME2 after rotation in the feeding direction D3 at a constant speed.

As above, the medium ME0 having the test pattern TP0 is automatically inclined and conveyed to the reading unit 60 so as to reduce the influence of moire. Therefore, the second specific example can easily reduce the influence of moire when reading the test pattern TP0.

When the guide line GL1 is formed on the medium ME0, the controller 10 may cause the reading unit 60 to read the printing surface ME0p of the medium ME0 once, detect the guide line GL1 from the printing surface ME0p based on the reading result, and cause the medium ME0 to be back fed. Thereafter, the controller 10 may perform processing of inclining the medium ME0 by the inclination angle θ in accordance with the guide line GL1 in cooperation with the inclination processing unit U2, cause the reading unit 60 to read the test pattern TP0, and acquire the read density of each of the patches PA0 based on the reading result.

Note that various configurations are conceivable for the inclination processing unit U2. For example, the inclination processing unit U2 may include an inclination processing member configured to advance and retract to a path in which the medium ME0 having the test pattern TP0 is conveyed to the reading unit 60, advance the inclination processing member to come into contact with the medium ME0, and incline the medium ME0 by the inclination angle θ.

It is assumed that the reading apparatus 3 includes an automatic document feeder called ADF, and the automatic document feeder includes a document feeding guide along a document feeding direction to the plurality of reading elements 61. In this case, the inclination processing unit U2 may change the orientation of the document feeding guide and the roller as necessary such that the document feeding direction is inclined by the inclination angle θ from the reference direction orthogonal to the element alignment direction D5.

(4) Third Specific Example of Printing Apparatus Including Reading Apparatus FIG. 10 schematically illustrates the flatbed reading apparatus 3 including the guide 63 that is rotationally controllable that determines the orientation of the medium ME0 such that the reading direction D10 is inclined by the inclination angle θ from the feeding direction D3 (see FIG. 2). The reading apparatus 3 including the controller 10 performs the reading step ST2. Since the main configuration of the printing apparatus 1 including the reading apparatus 3 is the same as the configuration illustrated in FIG. 1, the description will be omitted.

The reading unit 60 included in the reading apparatus 3 illustrated in FIG. 10 includes the medium placement unit 62 on which the medium ME0 having the test pattern TP0 is placed, and the plurality of reading elements 61 aligned to become the reading resolution Yr along the element alignment direction D5. The plurality of reading elements 61 read the density of the printing surface ME0p on the medium ME0 while moving in the movement direction D6 orthogonal to the element alignment direction D5. The reading apparatus 3 includes, as the control unit U1, the guide 63 having a rectangular shape for matching the position of the medium ME0 placed on the medium placement unit 62. The guide 63 is rotationally controllable along the printing surface ME0p of the medium ME0 placed on the medium placement unit 62. The guide 63 is brought into a state of being inclined by the inclination angle θ stored in the storage unit 23. The lower part of FIG. 10 illustrates a scene in which the guide 63 matches the reading direction D10 that serves as a reference of inclination from the feeding direction D3 with the movement direction D6 of the plurality of reading elements 61. Note that the guide 63 may match the reading direction D10 that serves as a reference of inclination from the feeding direction D3 with the element alignment direction D5.

When the guide line GL1 is formed on the medium ME0, the controller 10 may cause the plurality of reading elements 61 moving in the movement direction D6 to read the printing surface ME0p of the medium ME0 once, detect the guide line GL1 from the printing surface ME0p based on the reading result, and rotate the guide 63 so as to match the orientation of the guide line GL1 with the movement direction D6 of the plurality of reading elements 61. Thereafter, the controller 10 may cause the plurality of reading elements 61 moving in the movement direction D6 to read the test pattern TP0 again and acquire the read density of each of the patches PA0 based on the reading result. The controller 10 may rotate the guide 63 so that the orientation of the guide line GL1 matches the element alignment direction D5. Thereafter, the controller 10 may cause the plurality of reading elements 61 moving in the movement direction D6 to read the test pattern TP0 again and acquire the read density of each of the patches PA0 based on the reading result.

The user may manually rotate the guide 63. By rotating the guide 63 so that the orientation of the guide line GL1 matches the movement direction D6 of the plurality of reading elements 61, the user can incline the reading direction D10 by the inclination angle θ from the feeding direction D3 at the time of printing. In this case, the reading direction D10 that serves as a reference of inclination from the feeding direction D3 is the movement direction D6. By rotating the guide 63 so that the orientation of the guide line GL1 matches the element alignment direction D5, the user can incline the reading direction D10 by the inclination angle θ from the feeding direction D3 at the time of printing. In this case, the reading direction D10 that serves as a reference of inclination from the feeding direction D3 is the element alignment direction D5.

As described above, the guide 63 determines the orientation of the medium ME0 to be placed on the medium placement unit 62 such that the reading direction D10 is inclined by the inclination angle θ from the feeding direction D3 when the test pattern TP0 present on the medium ME0 placed on the medium placement unit 62 is read by the plurality of reading elements 61. Due to this, the medium ME0 having the test pattern TP0 is inclined so as to reduce the influence of moire, and is read by the plurality of reading elements 61. Therefore, the third specific example can also easily reduce the influence of moire when reading the test pattern TP0.

(5) Fourth Specific Example of Printing Apparatus Including Reading Apparatus FIG. 11 schematically illustrates the flatbed reading apparatus 3 including a jig 65 that determines the orientation of the medium ME0 such that the reading direction D10 is inclined by the inclination angle θ from the feeding direction D3 (see FIG. 2). The reading apparatus 3 including the controller 10 performs the reading step ST2. Since the main configuration of the printing apparatus 1 including the reading apparatus 3 is the same as the configuration illustrated in FIG. 1, the description will be omitted.

The reading unit 60 included in the reading apparatus 3 illustrated in FIG. 11 also includes the medium placement unit 62 and the plurality of reading elements 61. The guide 63 as the control unit U1 illustrated in FIG. 11 includes a frame 64 having a rectangular shape surrounding the medium placement unit 62, and one or more of the jigs 65 that bring the medium ME0 into a state of being inclined by the inclination angle θ in accordance with the frame 64. The frame 64 is arranged at the edge part 62a of the medium placement unit 62 having a rectangular shape. The jig 65 has a right triangular shape, and the angle of the oblique side is matched the inclination angle θ. The jig 65 is a member separated from the frame 64, and can be placed on the medium placement unit 62 or removed from the medium placement unit 62. When the jig 65 is placed on the medium placement unit 62 with the oblique side facing the inside of the medium placement unit 62 and matched the corner of the frame 64, and the edge part of the medium ME0 is matched the oblique side of the jig 65, the reading direction D10 is matched the movement direction D6 or the element alignment direction D5. Due to this, the orientation of the medium ME0 having the test pattern TP0 becomes an orientation in which the reading direction D10 is inclined by the inclination angle θ from the feeding direction D3. Due to this, the medium ME0 having the test pattern TP0 is inclined so as to reduce the influence of moire, and is read by the plurality of reading elements 61. The controller 10 can acquire the read density of each of the patches PA0 based on the reading result of the test pattern TP0. Therefore, the fourth specific example can also easily reduce the influence of moire when reading the test pattern TP0.

(6) Modifications

Various modifications of the present disclosure can be considered.

For example, the printer 2 is not limited to a line printer in which a plurality of nozzles are continuously aligned over the entire width direction D1, and may be a serial printer in which the printing head 30 moves along the main scanning direction intersecting the feeding direction D3, or the like. That is, the scanning direction in which at least one of the medium ME0 and the printing head 30 moves is not limited to the direction along the feeding direction D3, and may be the width direction D1 intersecting the feeding direction D3.

In the scanning direction, the conveyance unit 50 may move the printing head 30 in place of moving the medium ME0, or may move both the medium ME0 and the printing head 30.

The reading unit 60 only needs to read the density of the printing surface ME0p in units of reading resolution, and is not limited to the reading unit including the plurality of reading elements 61 aligned so as to become the reading resolution Yr of the Y direction. For example, the plurality of reading elements 61 may be aligned so as to become the reading resolution Xr of the X direction, or may be aligned two-dimensionally in the X direction and the Y direction.

Types of color materials that form the printing image IMO onto the medium ME0 are not limited to C, M, Y, and K, and may include, in addition to C, M, Y, and K, orange, green, light cyan with a density lower than C, light magenta with a lower density than M, dark yellow with a higher density than Y, light black with a lower density than K, and uncolored color material for image quality improvement. The present technology can be applied also when color materials of some of C, M, Y, and K are not used.

The entity that performs the above-described processing is not limited to the CPU, and may be an electronic component other than the CPU such as an ASIC. Of course, a plurality of CPUs may cooperate to perform the above-described processing, or a CPU and another electronic component (e.g., an ASIC) may cooperate to perform the above-described processing.

The above-described processing can be changed appropriately, such as switching the order. For example, in the density correction processing illustrated in FIG. 8, the reading resolution setting processing of S104 can be performed before the printing resolution setting processing of S102.

Part of the above-described processing may be performed by the host apparatus HO1. In this case, the combination of the controller 10 and the host apparatus HO1 is an example of the printing apparatus 1.

(7) Conclusions

As described above, according to the present disclosure, it is possible to provide a technology and the like configured to reduce the influence of moire when reading a printed test pattern by various aspects. Of course, the basic operations and effects described above can be obtained even with a technology including only components according to the independent claims.

A configuration in which the configurations disclosed in the above-described examples are replaced with one another or the combinations are changed, a configuration in which a known technology and each of the configurations disclosed in the above-described examples are replaced with one another or the combinations are changed, or the like can be implemented. The present disclosure also includes these configurations.

What is claimed is:

1. A printing apparatus comprising:

a printing head having a nozzle row in which a plurality of nozzles configured to eject a droplet onto a medium are aligned;

a control unit that controls movement of at least one of the medium and the printing head in a scanning direction intersecting an alignment direction of the plurality of nozzles, and ejection of the droplet from the printing head;

a reading unit that reads a density of a printing surface in the medium in units of reading resolution in a first reading direction and a second reading direction intersecting the first reading direction; and a storage unit that stores test pattern data used in formation of a test pattern for correcting a printing characteristic; wherein the printing apparatus forms the test pattern on the medium and corrects the printing characteristic based on a reading result of the test pattern by the reading unit, the storage unit stores an inclination angle $\theta$ that satisfies $0°<\theta<90°$ along the printing surface of a reading direction that serves as a reference of inclination from the scanning direction of the first reading direction and the second reading direction, and the scanning direction, and the control unit causes the reading unit to read the test pattern in a state where the reading direction is inclined by the inclination angle $\theta$ from the scanning direction.

2. The printing apparatus according to claim 1, wherein the control unit controls the movement and ejection of the droplet such that a guide line for causing the reading unit to read the test pattern in a state where the reading direction is inclined by the inclination angle $\theta$ from the scanning direction is formed on the medium together with the test pattern.

3. The printing apparatus according to claim 1, wherein the control unit includes an inclination processing unit that inclines the medium such that the reading direction is inclined by the inclination angle $\theta$ from the scanning direction when the medium having the test pattern is conveyed to the reading unit.

4. The printing apparatus according to claim 1, wherein the reading unit includes a medium placement unit on which the medium is placed, and a plurality of reading elements that read a density of a printing surface of the medium while moving in at least one of the first reading direction and the second reading direction, and the control unit includes a guide that determines an orientation of the medium placed on the medium placement unit such that the reading direction is inclined by the inclination angle $\theta$ from the scanning direction when the test pattern present on the medium placed on the medium placement unit is read by the plurality of reading elements.

5. A reading method for moving, along a scanning direction intersecting an alignment direction of a plurality of nozzles configured to eject a droplet to a medium, at least one of the medium and a printing head having a nozzle row in which the plurality of nozzles are aligned, ejecting the droplet from the printing head, forming a test pattern for correcting a printing characteristic on the medium, and correcting the printing characteristic based on a reading result of the test pattern by a reading unit that reads a density of a printing surface in the medium in units of reading resolution in a first reading direction and a second reading direction intersecting the first reading direction, the reading method comprising:

a storing step for a storage unit to store an inclination angle $\theta$ that satisfies $0°<\theta<90°$ along the printing surface of a reading direction that serves as a reference of inclination from the scanning direction of the first reading direction and the second reading direction, and the scanning direction; and a reading step for the reading unit to read the test pattern in a state where the reading direction is inclined by the inclination angle $\theta$ from the scanning direction.

6. A reading apparatus that reads a test pattern for correcting a printing characteristic formed by a printing apparatus that forms the test pattern and includes a printing head having a nozzle row in which a plurality of nozzles configured to eject a droplet onto a medium are aligned, and a control unit that controls movement of at least one of the medium and the printing head in a scanning direction intersecting an alignment direction of the plurality of nozzles, and ejection of the droplet from the printing head, the reading apparatus comprising:

a reading unit that reads a density of a printing surface in the medium in units of reading resolution in a first reading direction and a second reading direction intersecting the first reading direction;

a conveyance unit that conveys the medium having the test pattern to the reading unit; and an inclination processing unit that inclines the medium such that a reading direction that serves as a reference of inclination from the scanning direction of the first reading direction and the second reading direction inclines by an inclination angle $\theta$ that satisfies $0°<\theta<90°$ along the printing surface from the scanning direction when the medium is conveyed to the reading unit.

7. A reading apparatus that reads a test pattern for correcting a printing characteristic formed by a printing apparatus that forms the test pattern and includes a printing head having a nozzle row in which a plurality of nozzles config-
ured to eject a droplet onto a medium are aligned, and a
control unit that controls movement of at least one of the
medium and the printing head in a scanning direction
intersecting an alignment direction of the plurality of nozzles, and ejection of the droplet from the printing head,
the reading apparatus comprising:

a medium placement unit on which the medium is placed;

a plurality of reading elements that read a density of a
        printing surface in the medium while moving in at least
one of a first reading direction and a second reading
        direction intersecting the first reading direction; and a guide that determines an orientation of the medium
        placed on the medium placement unit such that a
        reading direction that serves as a reference of inclination from the scanning direction of the first reading
        direction and the second reading direction inclines by
        an inclination angle $\theta$ that satisfies $0°<\theta<90°$ along the
        printing surface from the scanning direction when the
        test pattern on the medium placed on the medium
placement unit is read by the plurality of reading
        elements.

<div align="center">*   *   *   *   *</div>